US006976081B2

(12) United States Patent
Worger et al.

(10) Patent No.: US 6,976,081 B2
(45) Date of Patent: Dec. 13, 2005

(54) SESSION INITIATION PROTOCOL COMPRESSION

(75) Inventors: William R. Worger, Gilbert, AZ (US); Peter J. Armbruster, Chandler, AZ (US); Bradley R. Schaefer, Chandler, AZ (US); Mark L. Shaughnessy, Phoenix, AZ (US)

(73) Assignee: Motorola, Inc., Schaumburg, IL (US)

( * ) Notice: Subject to any disclaimer, the term of this patent is extended or adjusted under 35 U.S.C. 154(b) by 709 days.

(21) Appl. No.: 10/060,622

(22) Filed: Jan. 30, 2002

(65) Prior Publication Data

US 2003/0145115 A1 Jul. 31, 2003

(51) Int. Cl.[7] .............................................. G06F 15/16
(52) U.S. Cl. ...................................... 709/230; 709/247
(58) Field of Search ............................... 709/247, 203; 715/513

(56) References Cited

U.S. PATENT DOCUMENTS

| | | | | |
|---|---|---|---|---|
| 5,953,503 | A * | 9/1999 | Mitzenmacher et al. | 709/203 |
| 6,018,747 | A * | 1/2000 | Burns et al. | 707/203 |
| 6,163,811 | A * | 12/2000 | Porter | 709/247 |
| 6,178,461 | B1 * | 1/2001 | Chan et al. | 709/247 |
| 6,345,307 | B1 * | 2/2002 | Booth | 709/247 |
| 6,449,658 | B1 * | 9/2002 | Lafe et al. | 709/247 |
| 6,466,937 | B1 * | 10/2002 | Fascenda | 707/10 |
| 6,542,504 | B1 * | 4/2003 | Mahler et al. | 370/392 |
| 6,728,785 | B1 * | 4/2004 | Jungck | 709/247 |
| 6,751,209 | B1 * | 6/2004 | Hamiti et al. | 370/349 |
| 6,766,147 | B2 * | 7/2004 | O'Hare et al. | 455/72 |
| 6,772,144 | B2 * | 8/2004 | Brid et al. | 707/3 |
| 6,807,173 | B1 * | 10/2004 | Lee et al. | 370/389 |
| 6,828,925 | B2 * | 12/2004 | McCanne et al. | 341/51 |
| 6,883,035 | B2 * | 4/2005 | Hannu et al. | 709/247 |

OTHER PUBLICATIONS

Factor, M.; Sheinwald, D.; Yassour, B.-A.; "Software compression in the client/server environment" Data Compression Conference, 2001. Proceedings. DCC 2001. Mar. 27-29, 2001 pp.: 233-242.*

Larsson, N.J.; Moffat, A.; "Off-line dictionary-based compression" Proceedings of the IEEE, vol.: 88 , Issue: 11, Nov. 2000 pp.: 1772-1732.*

Mikael Degermark et al. "Low-loss TCP/IP header compression for wireless networks" Wireless Networks archive vol. 3 , Issue 5 (Oct. 1997) Special issue: mobile computing and networking: selected papers from MobiCom '96 pp.: 375-387.*

Handley et al.; "SIP: Session Initiation Protocol, Network Working Group Request for Comments (RFC) 2543"; Mar. 1999.*

* cited by examiner

*Primary Examiner*—Marc D. Thompson
(74) *Attorney, Agent, or Firm*—Frank J. Bogacz; Kevin D. Wills

(57) ABSTRACT

An arrangement for compressing (20) and uncompressing (40) system set up messages between a client and a server employing Session Initiation Protocol transmits a template (200) between client (10) and server (30). A template is pre-placed (78) by clients or servers with other clients or servers. During execution time when a client requests services by connecting to a server only a minimal template (106) is transmitted from client to server. The server then reconstructs (40) the original uncompressed message.

20 Claims, 4 Drawing Sheets

SESSION INITIATION PROTOCOL COMPRESSION

BACKGROUND OF THE INVENTION

The present invention pertains to communication systems and more particularly to communication systems employing Session Initiation Protocol.

Current trends in telecommunications are moving toward Internet Protocol (IP) related protocols and processes to perform tasks that used to be performed by circuit based technology. One of these internet protocol related protocols is the Session Initiation Protocol (SIP) which is used to set up, tear down and modify generic communication sessions within a communication system. See IETF RFC 2543 on "Session Initiation Protocol"1 (SIP). SIP is a control protocol for creating, modifying and terminating communication sessions with one or more participants. These communication sessions include internet multimedia conferences, internet (or any IP network) telephone calls and multimedia distribution. SIP supports communication session descriptions that allow participants to agree on a set of compatible media types. It also supports user mobility by proxying and redirecting requests to the user's current location.

Although SIP is very generic and flexible, it presents problems in that the set up messages are extremely large relative to over-the-air signaling messages used in many cellular systems. As a result it may take a significant period of time to transfer SIP set up and negotiation messages over slow links such as RF links. The slow transfer time results in a slow set up time for communication sessions.

For example, it takes about one-half second to transfer a SIP invite message over a 9600 BPS link. This results in at least a set up time of one second if both initiating and responding equipments are using RF links. This set up time is unacceptable for many applications such as dispatch, where the total set up time must be very fast.

Several other solutions to the problem employ using standard data compression techniques. These techniques, however, result in reduction of SIP set up messages by less than one-half. These solutions are inadequate to provide a fast set up time for SIP communication systems.

Accordingly, it would be highly advantageous to have a SIP set up message arrangement which substantially reduces the size of SIP set up messages and thereby the time required to set up SIP communications.

DETAILED DESCRIPTION OF THE PREFERRED EMBODIMENT

This invention conceptually pre-places data elements from a SIP header into a template located on the far end of a link between a client application and a server. The pre-placement of data elements is done prior to call set up and may for example be done during registration or other synchronization events by a near end device such as a mobile unit. Instead of transmitting a large setup message between client and server, which is thousands of bits in length, it is replaced with a template which is less than 50 bits. The template is actually transmitted between the client and the server or vice versa. At the far end the template information is converted back into a standard setup message and the setup message accordingly handled.

Figure 1:
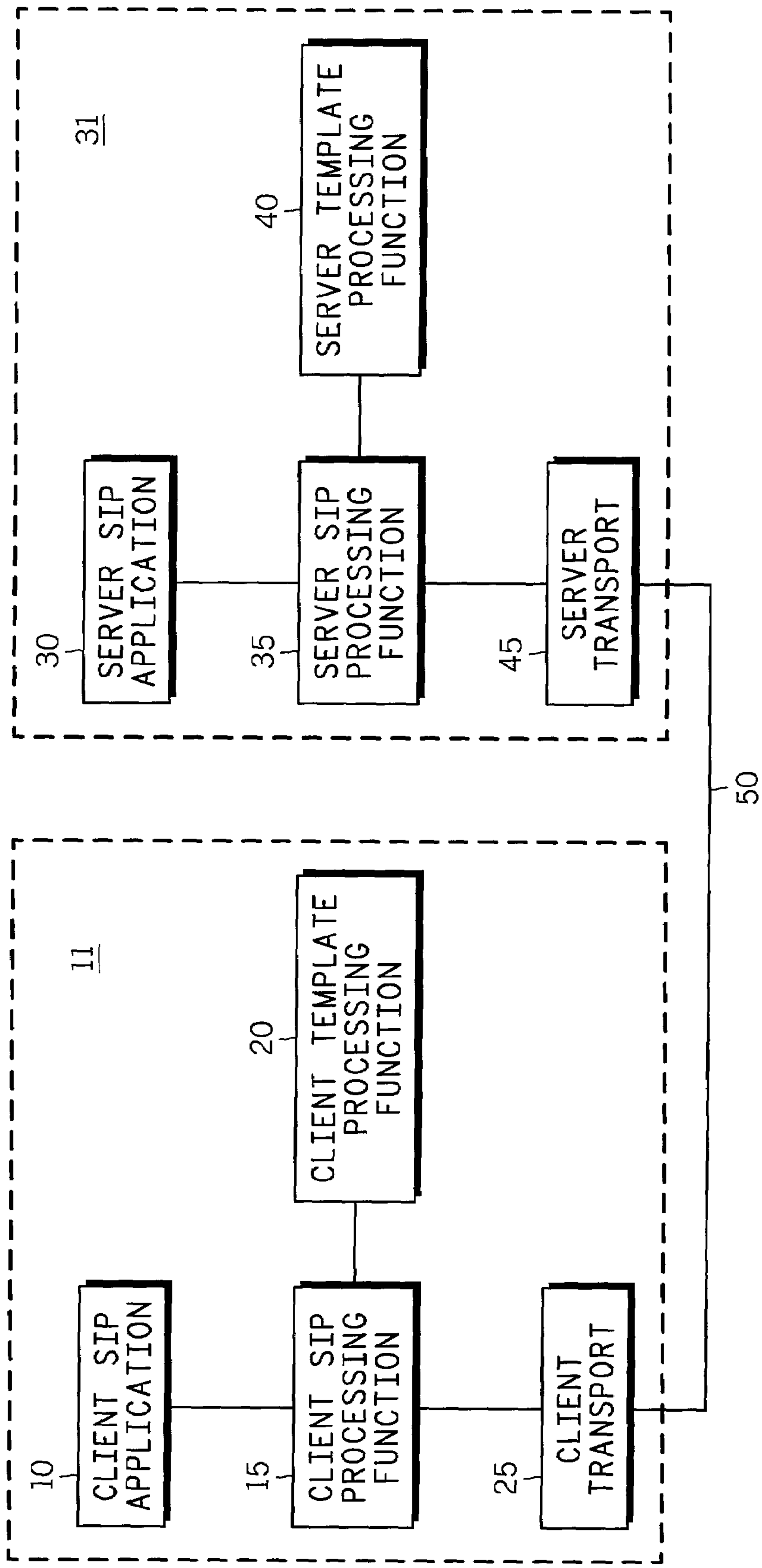
FIG. 1 is a block diagram of a SIP communication in accordance with the present invention.

FIG. 1 depicts a block diagram of an arrangement for SIP compression for system messages over limited bandwidth lengths. Client SIP application 10 requires the services of a server SIP application 30 to access the internet, for example. Typically clients of application 10, which may be a software program in a preferred embodiment, initiates a call to server SIP application 30 with a SIP invite message. This invite message includes a header that is many thousands (four to five thousand) bits of information in length. In response messages are transmitted back and forth over the limited bandwidth link 50. In a preferred embodiment, the limited bandwidth link 50 may comprise an RF (radio frequency) link, using various physical and link layer protocols known in the art.

Client SIP application 10, client SIP processing function 15, client template processing function 20 and client transport collectively may comprise a mobile unit 11. Mobile unit 11 may include such devices as mobile phones, pagers, personal digital assistants or other internet capable devices. Server 31 includes server SIP application 30, server SIP processing function 35, server template processing function 40 and server transport 45.

During registration, for example, client application 10 will communicate with server application 30 and set up a template in both the client template processing function 20 and the server template processing function 40. Client SIP application 10 generates a request for internet access to server SIP application 30. This request is transferred to client SIP processing function 15. Client SIP processing function 15 determines that this request is for server access to the internet, for example. Client SIP processing function 15 then transfers the request to the client template processing function 20. Client template processing function 20 determines that this message requires compression before being transmitted over the limited bandwidth link 50.

Figure 4:
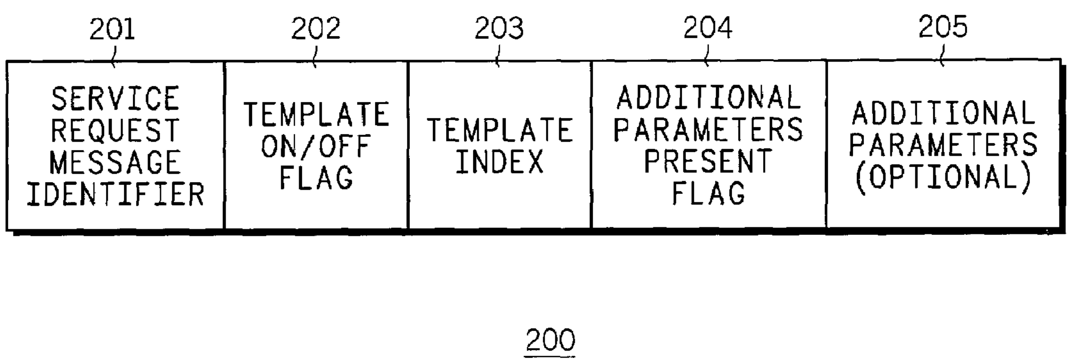
FIG. 4 is a bit layout of a sample SIP invite message in accordance with the present invention.

Client template processing function 20 determines that for the message requested by the client application 10, a particular template is required to be transmitted. Client template processing function 20 then converts or processes the requested SIP invite message, for example, to be a message as shown in FIG. 4. This message is typically 40 or 50 bits in length, although it may be as few as 18 bits long. The fields of this message will be discussed infra. Client template processing function 20 then returns the compressed message to client processing function 15. Client processing function 15 forwards the compressed message to client transport 25 for transmission over link 50 to the server 31.

Next, server transport 45 receives the compressed message from client transport 25. Server transport 45 forwards the received message to server SIP processing function 35. Server SIP processing function 35 determines that the message is a compressed message and forwards the message to server template processing function 40 for de-compression. Server template processing function then determines and retrieves the appropriate template and inserts any parameters which may have been transmitted in the compressed message. The de-compressed message or template is then sent to SIP server processing function 35 which forwards the message to SIP server application 30. Server SIP application 30 then acts upon the message to establish the required internet access, for example.

Templates are pre-stored by the server template processing function 40. Client template processing function 20 sets up a compressed message which indicates one of the many templates to the server template processing function 40. Templates may be prestored as an overt action, but natural events such synchronizing address books, using the WAP browser, etc, can provide convenient times to update the templates. As new extensions are introduced into SIP standards, existing templates can be modified, or additional templates added, to support this compression method. These modifications/additions need only be introduced in the mobile client or the network, since the mobile client and network synchronize their templates. Client template processing function 20 inserts parameters that may be required for the particular message being transmitted. Server template processing function extracts these parameters from the compressed message and inserts each parameter into the de-compressed message at the appropriate locations. Effectively, the message sent by the client SIP application 10 is reconstructed by the server template processing function 40 before it is delivered to the server SIP application 30. In this way, messages sent over the limited bandwidth link 50, in a preferred embodiment an RF link, may be minimized in length and transmission time. These messages may be as small as 18 bits and approximately 40 or 50 bits may be typical. This is contrasted with the typical SIP invite message, for example, which is in the range of four to five thousand bits. This template arrangement saves much time in transmission over the limited bandwidth link 50 and considerably reduces the setup and connect time for clients to services such as internet access.

Figure 2:
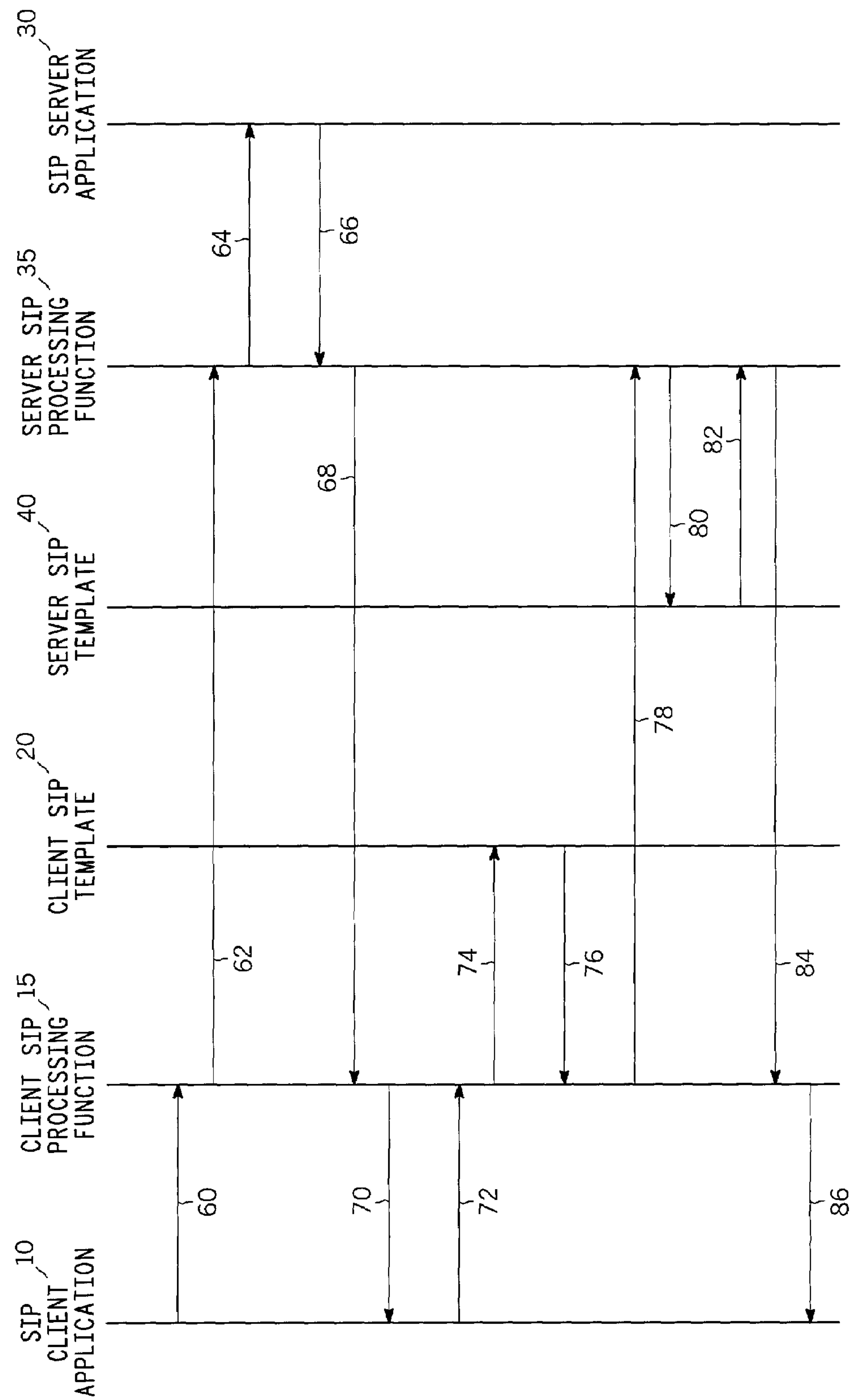
FIG. 2 is a message flow diagram of a registration process for SIP communication in accordance with the present invention.

Turning now to FIG. 2, the template set up process is shown in a message flow diagram. Typically, the client SIP application 10 pre-places the fixed template information during the registration process, that is, when the client device registers with the RF system, for example. The pre-placement is done at a time prior to the actual session set up. The pre-placement may be done when a mobile terminal is powered on, for example, or when it first registers with the RF system. Typically, the fixed template information is pre-placed by the client, but templates may also be pre-placed by the server.

Prior to setting the template, the client SIP application 10 sends a SIP register message 60 to the client SIP processing function 15. Client SIP processing function transmits this message through client transport 25 and server transport 45 to server Sip processing function 35. For the sake of brevity, client transport 25 and server transport 45 are not shown in FIG. 2. They are merely passed through functions for the purpose of message transmission between client and server or vice versa.

SIP register message 64 is then transmitted from server SIP processing function 35 to server SIP application 30. Server SIP application 30 then transmits an OK message acknowledgment 66 back to server SIP processing function 35. Server SIP processing function 35 then responds to the client SIP processing function 15 with an OK message 68.

Subsequently client's SIP application 10 then sends a set template message 72 to client SIP processing function 15. Client SIP processing function 15 sends the set template massage 74 to the client SIP template processing function 20. Client SIP template processing function 20 then responds with an OK message acknowledgment 76 to the client SIP processing function 15. Client SIP processing function 15 then transmits the set template message 78 to the server SIP processing function 35. The server SIP processing function 35 stores the template for subsequent access during the session request process. Server SIP processing function 35 then sends a set template message 80 to the server SIP template processing function 40 for storage. Server SIP template processing function 40 then responds with an OK message 82 to server SIP processing function 35. Server SIP processing function 35 then responds with an OK acknowledgment message 84 to the client's SIP processing function 15. Lastly, client SIP processing function 15 responds to the client SIP application 10 with OK acknowledgment message 86. At this point the client SIP application 10 has successfully installed a template for later use by the server.

The template can be changed at each registration process as shown in FIG. 2, although the template need not be changed on each registration. The extensions to the SIP standard can be incorporated with the need to update both the client mobile unit subscriber or the network infrastructure.

Figure 3:
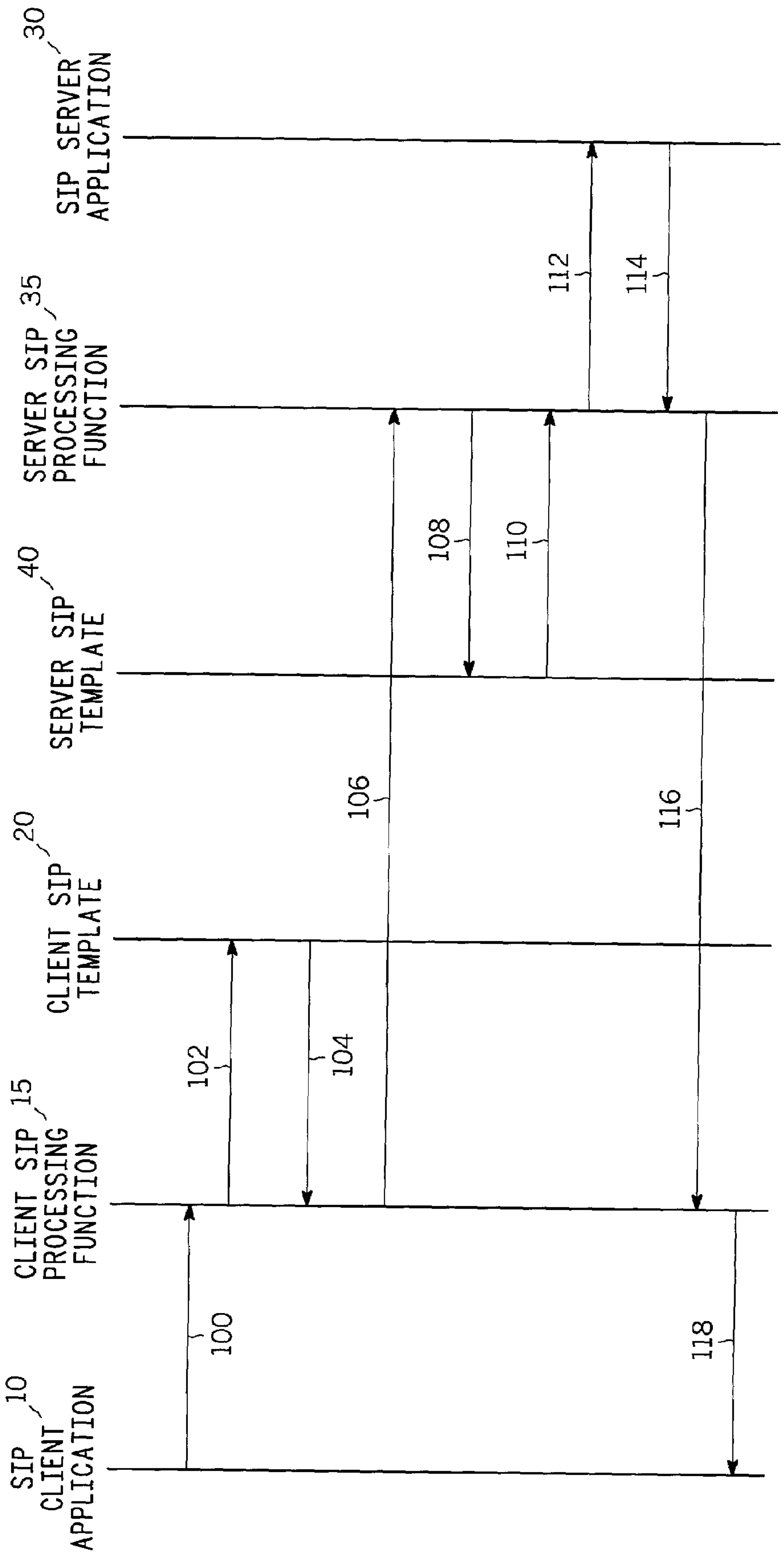
FIG. 3 is a message flow diagram of a SIP invite message processed in accordance with the present invention.

Turning now to FIG. 3, the message compression procedure is shown. For purposes of illustration a SIP invite message will be used as an example. However, this process may be applied to any of the system or application messages transmitted. Client SIP application 10 prepares and transmits the SIP invite message (header) 100 to the client SIP processing function 15. Client SIP processing function 15 determines that compression of this message is required. Client SIP processing function 15 then transmits the SIP invite message 102 to client SIP template processing function 20. Client SIP template processing function 20 then compresses the SIP invite header into a SIP invite template 104 and transmits the template to client SIP processing function 15. Client SIP processing function 15 then transmits the SIP invite template 106 through client transport 25, link 50 and server transport 45 to server SIP processing function 35. Server SIP processing function 35 determines that the message received is a template by for example, examining a control bit in the message and transmits the SIP invite template 108 to the server SIP template processing function 40. Server SIP template processing function 40 then locates the appropriate full text message, in this case a SIP invite header message and inserts any transmitted parameters at the appropriate location and provides the SIP invite header in its uncompressed form back to server SIP processing function 35. Server SIP processing function 35 then transmits or presents the de-compressed SIP invite header message 112 to the SIP server application 30 for appropriate processing.

Server SIP application 30 then responds with an OK message 114 to server SIP processing function 35. Likewise, server SIP processing function 35 responds with an OK message 116 to acknowledge receipt and processing of the template to client SIP processing function 15. Lastly, client SIP processing function 15 responds to the client SIP application 10 with an OK message 118 indicating that the request, in this case a SIP invite header, has been received by the server and processed. The above process may be used to effectively compress whole messages or to transmit single or multiple parameters of a message. This above-described process saves the time of transmitting complete messages over the limited bandwidth link 50 which may in the preferred embodiment be an RF link.

The processing ability of the client server is substituted for the transmission time over link 50, thereby requiring a minimum of real time transmission and allowing SIP set ups to occur very rapidly instead of taking many seconds to accomplish.

FIG. 4 depicts a bit map of a sample template which is transmitted between client and server. The example shown in FIG. 4 is a SIP invite template 200. SIP invite template 200 includes a service request message identifier data field 201. This field identifies the kind or type of message, in this case a SIP invite message. In a preferred embodiment of the invention this field will be approximately eight bits in length.

The next field of SIP invite message 200 is the template on/off flag data field 202. This field is a one bit field which indicates whether the particular message is or is not a template. If this field is set to one, the message is a template and if the field is reset to zero, the message is not a template.

The next data field of the SIP invite message 200 is the template index 203. The template index is a number which tells the far end, typically the server, which particular pre-placed template is to be reconstructed. In a preferred embodiment, this data field is eight bits in length although larger amounts of bits may be required to distinguish templates.

The last data field of SIP invite message 200 is the additional parameters present flag 204. This data field is a one bit field which indicates when set to one that additional parameters are included within optional field 205 which are the additional parameters. When field 204 is set to zero, it indicates that no additional parameters are present.

As can be seen, the message of FIG. 4 actually transmitted between client and server or vice versa via the link 50 is quite short and may be as short as 18 bits in length. Typical SIP invite messages are, for example, four or five thousand bits in length and require several seconds for transmission and acknowledgements to proceed. In a single template message the information may be transmitted and acknowledged in hundredths or thousandths of a second instead of several seconds. Thereby the setup time for client access to such services as session based communication through the internet may be virtually transparent and does not impede links such as wireless links connecting clients and servers.

Although the preferred embodiment of the invention has been illustrated, and that form described in detail, it will be readily apparent to those skilled in the art that various modifications may be made therein without departing from the spirit of the present invention or from the scope of the appended claims.

What is claimed is:

1. A message compression method comprising the steps of:

- pre-placing a message template at a far end communication system of a communication link;
- generating a compressed message related to the template message, wherein generating comprises:
  - providing a service request message identifier within the compressed message;
  - providing a template on/off flag within the compressed message; and
  - providing a template index within the compressed message, wherein generating the compressed message references the message template at the far end communication system without using the message template to generate the compressed message; transmitting by a near end communication system the compressed message; and
- producing at the far end communication system an uncompressed message.

2. A message compression method as claimed in claim 1, wherein the step of producing includes the step of combining the message template and the compressed message.

3. A message compression method as claimed in claim 2, wherein the step of combining includes the step of determining by the far end communication system that the compressed message is a request for a message template.

4. A message compression method as claimed in claim 3, wherein the step of combining further includes the step of obtaining a template index from the compressed message to indicate an identity of a requested message template.

5. A message compression method as claimed in claim 4, wherein the step of combining further includes the step of determining by the far end communication system whether the compressed message indicates whether additional parameters are present.

6. A message compression method as claimed in claim 5, wherein the step of combining further includes the steps of:

- if the additional parameters are present:
- removing each additional parameter from the compressed message; and
- inserting each additional parameter into the message template.

7. A message compression method as claimed in claim 6, wherein there is further included a step of iterating the steps of removing and inserting for each additional parameter.

8. A message compression method as claimed in claim 1, wherein the step of generating includes the step of generating the compressed message by a template processing function at the near end communication system.

9. A message compression method as claimed in claim 1, wherein the step of generating further includes the steps of:

- providing an additional parameters are present flag within the compressed message; and
- providing additional parameters within the compressed message.

10. A message compression method as claimed in claim 1, wherein the step of pre-placing includes the step of transmitting an uncompressed message by the near end communication system.

11. A message compression method as claimed in claim 10, wherein the step of pre-placing includes the step of storing the uncompressed message as a template by a template processing function of the far end communication system.

12. A message compression method as claimed in claim 1, wherein the message compression method is provided within a Session Initiation Protocol communication system.

13. A message compression method as claimed in claim 1, wherein the near end communication system and far end communication system are radio frequency communication systems.

14. A message compression method as claimed in claim 1, wherein:

- the near end communication system comprises a client SIP application or a server SIP application; and
- the far end communication system comprises a client SIP application or a server SIP application.

15. A SIP message compression method for a mobile unit comprising the steps of:

- pre-placing a message template at a server;
- generating a compressed message related to the template message, wherein generating comprises:
  - providing a service request message identifier within the compressed message;
  - providing a template on/off flag within the compressed message; and
  - providing a template index within the compressed message, wherein generating the compressed message references the message template at the server without using the message template to generate the compressed message;

transmitting by the mobile unit the compressed message over an RF link; and combining by the server the compressed message and the message template to produce an uncompressed message.

16. The SIP message compression method as claimed in claim 15, wherein the step of pre-placing includes the steps of:

transmitting by the mobile unit the message template; and storing the message template by a template processing function of the server.

17. The SIP message compression method as claimed in claim 15, wherein the step of generating includes the step of generating the compressed message by a template processing function of the mobile unit.

18. The SIP message compression method as claimed in claim 15, wherein the step of generating further includes the steps of:

providing an additional parameters are present flag within the compressed message; and providing additional parameters within the compressed message.

19. The SIP message compression method as claimed in claim 16, wherein the step of combining includes the steps of:

determining by the template processing function of the server whether a compressed message is received; and determining by the template processing function of the server which message template is related to the compressed message.

20. The SIP message compression method as claimed in claim 19, wherein there is further included the steps of:

removing parameters from the compressed message by the template processing function of the server; and inserting the removed parameters into the message template by the template processing function of the server.

* * * * *